United States Patent
Kunihiro et al.

(10) Patent No.: US 10,427,712 B2
(45) Date of Patent: Oct. 1, 2019

(54) AUTOMATIC DRIVING SYSTEM

(71) Applicant: TOYOTA JIDOSHA KABUSHIKI KAISHA, Toyota-shi, Aichi-ken (JP)

(72) Inventors: Yoji Kunihiro, Susono (JP); Yoshinori Watanabe, Isehara (JP); Yoshio Kudo, Machida (JP); Yutaka Aoki, Miyoshi (JP); Ryo Irie, Okazaki (JP); Masateru Amano, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 15/902,240

(22) Filed: Feb. 22, 2018

(65) Prior Publication Data
US 2018/0304918 A1    Oct. 25, 2018

(30) Foreign Application Priority Data
Apr. 19, 2017 (JP) ................. 2017-082885

(51) Int. Cl.
| B62D 5/04 | (2006.01) |
| B62D 6/08 | (2006.01) |
| B62D 15/02 | (2006.01) |
| B62D 6/00 | (2006.01) |
| B62D 1/28 | (2006.01) |

(52) U.S. Cl.
CPC ........... *B62D 5/0481* (2013.01); *B62D 1/286* (2013.01); *B62D 5/0463* (2013.01); *B62D 6/002* (2013.01); *B62D 6/08* (2013.01); *B62D 15/025* (2013.01)

(58) Field of Classification Search
CPC .................................................. B62D 5/0481
See application file for complete search history.

(56) References Cited

U.S. PATENT DOCUMENTS

| 6,448,728 | B2* | 9/2002 | Noro | B62D 5/0463 180/443 |
| 8,190,330 | B2* | 5/2012 | Lee | B62D 15/0255 342/71 |
| 9,227,663 | B2* | 1/2016 | Matsuno | B62D 15/025 |
| 2001/0052756 | A1* | 12/2001 | Noro | B62D 5/0463 318/432 |
| 2015/0012179 | A1* | 1/2015 | Matsuno | B62D 15/025 701/41 |

(Continued)

FOREIGN PATENT DOCUMENTS

| JP | 2016-99713 A | 5/2016 |
| JP | 2016-179810 A | 10/2016 |

(Continued)

*Primary Examiner* — Alex C Dunn
(74) *Attorney, Agent, or Firm* — Oliff PLC

(57) ABSTRACT

The automatic driving system comprises an electric power steering apparatus and a control apparatus that performs automatic steering control. The control apparatus is programmed to perform determining processing and coping processing. In the determining processing, it is determined whether the automatic driving system is working well or not working well, based on tracking condition of the target traveling route by the vehicle. The coping processing is processing to increase a degree with which the steering intervention by the driver is reflected to a control variable of the electric power steering apparatus when the automatic driving system is determined to be not working well.

7 Claims, 5 Drawing Sheets

(56) References Cited

U.S. PATENT DOCUMENTS

| | | | |
|---|---|---|---|
| 2015/0259007 A1* | 9/2015 | Di Cairano | B62D 15/025 |
| | | | 701/41 |
| 2016/0139598 A1 | 5/2016 | Ichikawa et al. | |
| 2016/0288831 A1* | 10/2016 | Lee | B62D 6/00 |
| 2018/0201307 A1* | 7/2018 | Kudo | B62D 1/28 |
| 2018/0281849 A1* | 10/2018 | Irie | B62D 6/007 |
| 2019/0039647 A1* | 2/2019 | Tsubaki | B62D 6/00 |
| 2019/0054955 A1* | 2/2019 | Kalabic | B62D 15/025 |

FOREIGN PATENT DOCUMENTS

| | | |
|---|---|---|
| JP | 2016-181031 A | 10/2016 |
| JP | 2016-200986 A | 12/2016 |

\* cited by examiner

| | | Transient deviation | |
|---|---|---|---|
| | | Small | Large |
| Steady-state deviation | Small | Usual automatic steering control | Decrease control gain of automatic steering control |
| | Large | Increase assisting force for assisting driver's steering operation | Decrease control gain of automatic steering control & Increase assisting force for assisting driver's steering operation |

AUTOMATIC DRIVING SYSTEM

CROSS-REFERENCE TO RELATED APPLICATION

This application claims priority to Japanese Patent Application No. 2017-082885, filed on Apr. 19, 2017, which is incorporated by reference herein in its entirety.

BACKGROUND

Field

The present disclosure relates to an automatic driving system that controls an electric power steering apparatus to make a vehicle travel along a target traveling route.

Background Art

As disclosed in JP2016-181031A, it is proposed to bring a vehicle to a halt, or to stop automatic drive and hand over driving of the vehicle to a driver, when abnormality occurs in an automatic driving system. In addition to this document, various proposals are made regarding a measure to be taken when abnormality occurs.

As a condition of the automatic driving system, there is a condition where the automatic driving system is not abnormal but cannot provide its original performance. In the present disclosure, such a condition is referred to as a condition where the automatic driving system is not working well. Also, in the present disclosure, a condition where the automatic driving system can provide its original performance is referred to as a condition where the automatic driving system is working well. The condition where the automatic driving system is not working well is classified as a normal condition. Therefore, when the automatic driving system is not working well, a special measure for an abnormal condition is not taken, and control having the same content as control performed when the automatic driving system is working well is performed. Thus, when the automatic driving system is not working well, decrease of the function of the automatic drive, for example, decrease of trackability of the vehicle with respect to a target traveling route occurs, and thereby discomfort may be given to the driver.

When the driver feels discomfort with respect to the control by the automatic driving system, the driver often operates a steering wheel to correct the trajectory or the attitude of the vehicle. If such a steering intervention by the driver is done well, the trackability of the vehicle with respect to the target traveling route is enhanced to make vehicle behavior stable.

However, the automatic driving system continues automatic driving control even when it is not working well. Thus, steering force is input from the automatic driving system to the driver to prevent the steering intervention by the driver, and thereby further discomfort may be given to the driver.

To ensure the trackability of the vehicle with respect to the target traveling route when the automatic driving system is not working well, it is preferred that the condition where the automatic driving system is not working well is compensated by the steering intervention by the driver. For this, it is demanded that the steering intervention by the driver is not prevented and thereby discomfort given to the driver who intervenes in steering is reduced.

SUMMARY

The present disclosure is made in the light of the problem as described above, and has an object to provide an automatic driving system that can reduce discomfort given to a driver who intervenes in steering when the automatic driving system is not working well.

An automatic driving system according to the present disclosure comprises an electric power steering apparatus and a control apparatus. The control apparatus is programmed to perform automatic steering control for controlling the electric power steering apparatus to make a vehicle travel along a target traveling route while allowing a steering intervention by a driver. Furthermore, the control apparatus is programmed to perform: determining processing to determine whether the automatic driving system is working well or not working well, based on tracking condition of the target traveling route by the vehicle; and coping processing to increase a degree with which the steering intervention by the driver is reflected to a control variable of the electric power steering apparatus when the automatic driving system is determined to be not working well.

When the degree with which the steering intervention by the driver is reflected to the control variable of the electric power steering apparatus is increased, a degree with which the automatic steering control is reflected to the control variable of the electric power steering apparatus is decreased correspondingly. Thereby, the force preventing the steering intervention that acts to the driver from the automatic driving system when the driver intervenes in steering is decreased. Thus, according to the above described configuration, discomfort given to the driver who intervenes in steering when the automatic driving system is not working well is reduced.

In the above described configuration, the determining processing may be performed based on, for example, magnitude of a lateral deviation of the vehicle with respect to the target traveling route, magnitude of a steady-state deviation extracted from the lateral deviation, or magnitude of a transient deviation extracted from the lateral deviation.

The control apparatus may be programmed to perform the coping processing only when the driver is holding a steering wheel. Stated differently, during hand-releasing drive in which the driver is not holding the steering wheel, the coping processing may not be performed to keep the degree with which the automatic steering control is reflected to the control variable of the electric power steering apparatus. Thereby, decrease of the trackability during the hand-releasing drive can be prevented.

The control apparatus may be programmed to increase an assisting force for assisting the driver's steering operation in comparison with a case where the automatic driving system is working well, in the coping processing. Thereby, it is possible to lighten a load on the driver who steers the steering wheel against the automatic steering control. The coping processing may be performed when the magnitude of the steady-state deviation included in the lateral deviation of the vehicle with respect to the target traveling route is larger than a predetermined threshold. When the steady-state deviation is large, the steering wheel is correctively steered to one direction by steering torque generated by the automatic steering control. The driver has to keep the steering wheel against the steering torque generated by the automatic steering control, and is forced to bear a large load. However, by increasing the assisting force for assisting the driver's steering operation, the load on the driver is lightened and discomfort given to the driver is reduced.

Also, the control apparatus may be programmed to decrease a control gain of the automatic steering control in comparison with a case where the automatic driving system is working well, in the coping processing. Thereby, it is possible to reduce troublesomeness that the driver senses with respect to a variation of the steering torque generated by the automatic steering control. The coping processing may be performed when the magnitude of the transient deviation included in the lateral deviation of the vehicle with respect to the target traveling route is larger than a predetermined threshold. When the transient deviation is large, the steering wheel is correctively steered to right and left directions by the steering torque generated by the automatic steering control. In this case, the driver has to keep the steering wheel against the steering torque generated by the automatic steering control, and senses troublesomeness. However, by decreasing the control gain of the automatic steering control, periodic steering of the steering wheel by the steering torque is suppressed and troublesomeness given to the driver is reduced.

As described above, according to the automatic driving system according to the present disclosure, it is possible to reduce discomfort given to the driver who intervenes in steering when the automatic driving system is not working well.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly specified by the numerals theoretically. Furthermore, structures that are described in the embodiment shown as follows are not always indispensable to the disclosure unless specially explicitly shown otherwise, or unless the disclosure is explicitly specified by the structures theoretically.

1. Configuration of Automatic Driving System

Figure 1:
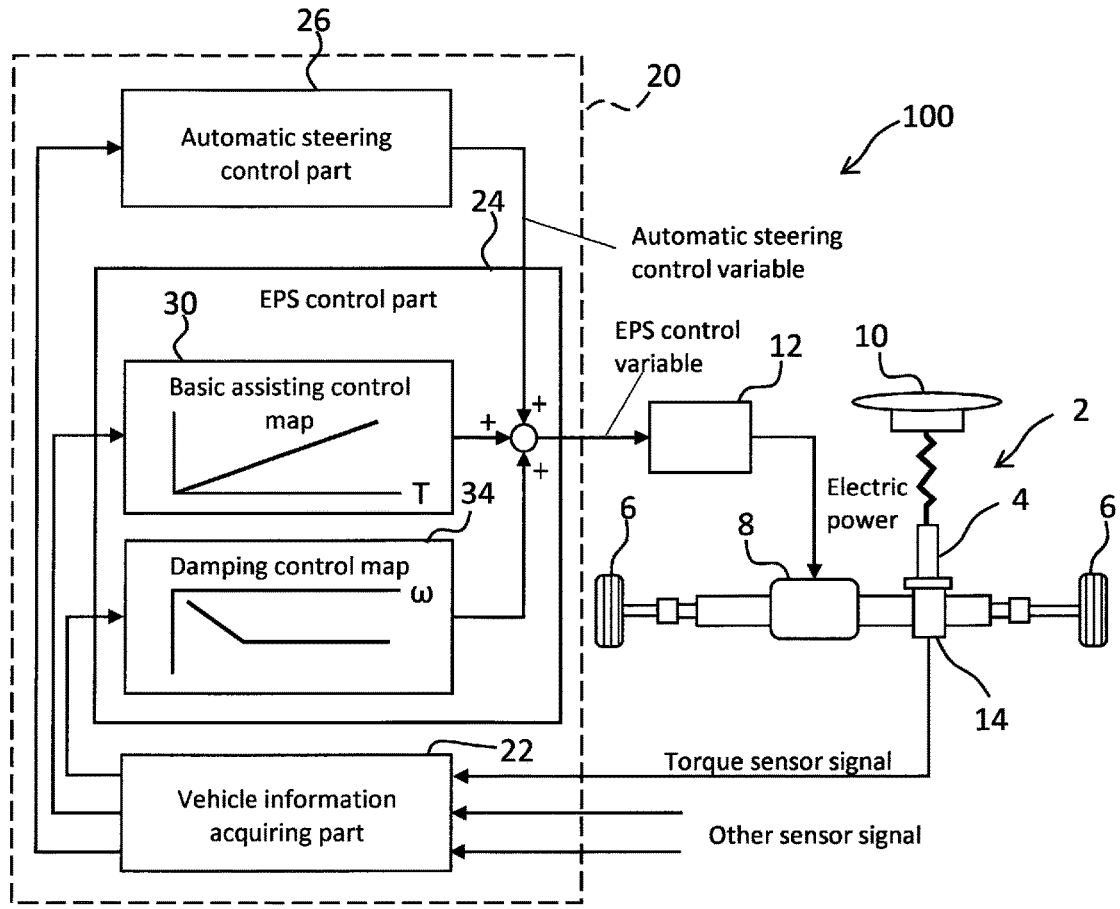
FIG. 1 is a view illustrating a configuration of an automatic driving system according to an embodiment.

An automatic driving system according to the present embodiment is one mounted on an autonomous driving vehicle. FIG. 1 is a view illustrating a configuration of the automatic driving system according to the present embodiment, particularly, a view illustrating especially a configuration related to an automatic steering function among various functions that the automatic driving system has. First, the structure of the automatic driving system will be described using FIG. 1.

The automatic driving system 100 comprises an electric power steering apparatus 2. The electric power steering apparatus 2 comprises a steering mechanism 4 coupling a steering wheel 10 for operation by the driver and right and left front wheels 6, 6 that are steered wheels. The steering mechanism 4 comprises a steering column shaft into which rotation operation of the steering wheel 10 is input, a gear mechanism to increase operation force generated by the rotation operation input into the steering column shaft, and a link mechanism that transmits the operation force transmitted from the gear mechanism to the right and left front wheels 6, 6. There is no limitation on a specific structure of each mechanism that constructs the steering mechanism 4.

The electric power steering apparatus 2 comprises a motor 8 that receives supply of electric power to generate torque and gives generated torque to the steering mechanism 4. In FIG. 1, the electric power steering apparatus 2 is constituted as a rack assist type electric power steering apparatus that transmits torque of the motor 8 to the rack of the gear mechanism. However, a column assist type or a pinion assist type may be adopted as the type of the electric power steering apparatus 2. The motor 8 is driven by receiving supply of electric power from a motor driver 12

Next, the control system of the automatic driving system 100 will be described.

The automatic driving system 100 comprises a plurality of sensors to measure a physical quantity related to the steering control. A torque sensor 14 measuring steering torque input by the driver is attached to the steering mechanism 4. The torque sensor 14 measures, for example, a torsion angle of a torsion bar in the steering column shaft and converts the torsion angle into the steering torque. The torque sensor 14 can measure a steering angle too in addition to the steering torque.

The automatic driving system 100 comprises a plurality of inside information sensors (not shown) to acquire inside information that is information on conditions of the vehicle such as a speed sensor, an acceleration sensor, and a yaw rate sensor in addition to the torque sensor 14. Furthermore, the automatic driving system 100 comprises a GPS equipment (not shown) to acquire location information of the vehicle and a plurality of outside information sensors (not shown) to acquire information on circumstances outside of the vehicle such as a camera, a radar, and a LIDAR. However, such various sensors need not necessarily be an exclusive article for the steering control by the automatic driving system 100, and may be used in common with other equipment.

The automatic driving system 100 comprises a control apparatus 20. The above sensors are connected to the control apparatus 20 directly or through a communication network constructed in the vehicle. The control apparatus 20 is an ECU (Electronic Control Unit) having at least one processor and at least one memory. Various programs and various data including maps for the steering control are stored in the memory. When programs stored in the memory are executed by the processor, various functions concerning the steering control are implemented to the control apparatus 20. The control apparatus 20 may consist of a plurality of ECUs.

The control apparatus 20 is configured to set a control variable to the motor driver 12. This control variable is that with respect to the electric power steering apparatus 2, and hereafter is referred to as an EPS control variable. The EPS control variable is represented by a current value or a torque value. The control apparatus 20 is configured to control the steering torque supplied to the steering mechanism 4 from the motor 8 by adjusting the EPS control variable set to the motor driver 12.

As illustrated with blocks in FIG. 1, the control apparatus 20 comprises a vehicle information acquiring part 22, an EPS control part 24 and an automatic steering control part 26. These parts 22, 24, 26 correspond to a program or part of a program that is stored in the memory of the control apparatus 20. The functions of these parts 22, 24, 26 are realized in the control apparatus 20 by the program being read from the memory and being performed with the processor.

The vehicle information acquiring part 22 acquires signals from various sensors including the torque sensor 14. By these signals or by processing these signals, various information on the vehicle is obtained. The information acquired by the vehicle information acquiring part 22 includes, for example, steering torque input by the driver, a steering angle, a vehicle speed, an acceleration, a yaw rate, a camera image and GPS location information. Also, the information acquired by the vehicle information acquiring part 22 includes the information obtained by a calculation based on sensor information, for example, a lateral deviation and yaw angle deviation of the vehicle with respect to the target traveling route. At least part of the information acquired by the vehicle information acquiring part 22 is sent to the EPS control part 24 and the automatic steering control part 26.

The EPS control part 24 calculates a control variable to make the electric power steering apparatus 2 act so as to assist the driver's operation of the steering handle 10. As means for realizing this function, the EPS control part 24 comprises, for example, a basic assisting control part 30 and a damping control part 34.

The basic assisting control part 30 calculates a basic assisting control variable to make the motor 8 generate an assisting force for assisting the driver's steering operation. A basic assisting control map of which the image is shown in the block is used for calculating the basic assisting control variable. By using the basic assisting control map, the basic assisting control variable is calculated from the steering torque T input by the driver that is measured by the torque sensor 14. However, characteristics of the map exemplified in FIG. 1 are characteristics obtained when the steering wheel 10 is turned to the left. When the steering wheel 10 is turned to the right, characteristics symmetric with respect to a zero point are used.

The damping control part 34 calculates a damping control variable to make the motor 8 generate a damping force for simulating the viscosity characteristics of the steering mechanism 4. A damping control map of which the image is shown in the block is used for calculating the damping control variable. By using the damping control map, the damping control variable is calculated from the steering speed co input by the driver that is measured by the torque sensor 14. However, characteristics of the map exemplified in FIG. 1 are characteristics obtained when the steering wheel 10 is turned to the left. When the steering wheel 10 is turned to the right, characteristics symmetric with respect to a zero point are used.

The automatic steering control part 26 calculates an automatic steering control variable to make the electric power steering apparatus 2 act so that the vehicle travels along the target traveling route. Details of the automatic steering control part 26 will be described later. The automatic steering control variable calculated by the automatic steering control part 26 is added to the sum of the basic assisting control variable and the damping control variable that are calculated by the EPS control part 24. Then, a control variable obtained by this addition is supplied to the motor driver 12 as the EPS control variable.

2. Overview of Function of Automatic Steering Control Part

Figure 2:
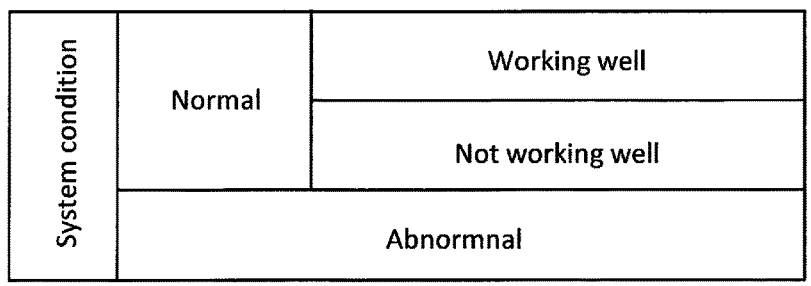
FIG. 2 is a view describing a classification of a condition of the automatic driving system.

The automatic steering control part 26 performs automatic steering control to make the vehicle travel along the target traveling route. The control structure for realizing the automatic steering control will be described later. The trackability of the vehicle with respect to the target traveling route during the execution of the automatic steering control depends on a condition of the automatic driving system 100. FIG. 2 is a view describing a classification of the condition of the automatic driving system 100.

The condition of the automatic driving system 100 is roughly classified into a normal condition and an abnormal condition. The abnormal condition of the automatic driving system 100 means a condition where it is difficult to start or continue the automatic drive by the automatic driving system 100. When an abnormality occurs in the automatic driving system 100, abnormality coping processing to cope with the abnormality is performed in the automatic steering control according to the content of the abnormality. However, the abnormality coping processing is not the essential part of the present application, and there is no limitation on the content thereof. Therefore, explanation of the abnormality coping processing is omitted in the present disclosure.

If the automatic driving system 100 is not in the abnormal condition, this means that the automatic driving system 100 is in the normal condition. The normal condition is further classified into two conditions. One of the two conditions is a condition where the automatic driving system 100 can provide its original performance, that is, a condition where the automatic driving system 100 is working well. The other of the two conditions is a condition where the automatic driving system 100 cannot provide its original performance, that is, a condition where the automatic driving system 100 is not working well. As the reason why the automatic driving system 100 is not working well, various possibilities are exemplified including a decrease in detection capability of a sensor related to the automatic steering control such as the camera and the yaw rate sensor, a change of a mechanical condition such as air pressure of a tire, and a deterioration in outside circumstances such as weather and a road surface condition. According to the conventional automatic driving system, the automatic steering control has been performed without distinguishing whether the automatic driving system is working well or not working well. However, the automatic driving system 100 according to the present embodiment, when the automatic driving system 100 is not working well, performs coping processing that is different from the processing performed when the automatic driving system 100 is working well.

Figures 3, 4:
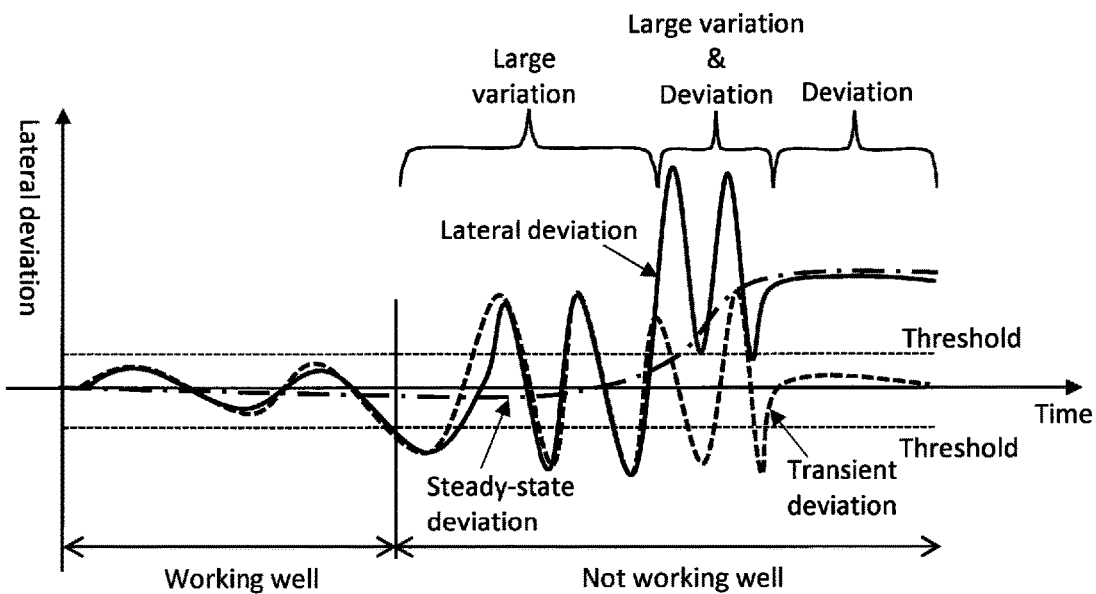
FIG. 3 is a view describing a method of determining whether the automatic driving system is not working well.
FIG. 4 is a view describing an overview of coping processing.

Here, a method of determining whether the automatic driving system is working well or not working well will be described using FIG. 3. In FIG. 3, a change with time of the lateral deviation of the vehicle with respect to the target traveling route is drawn with a solid line. When the automatic driving system 100 is working well, the amplitude of vibration of the lateral deviation is small. However, when the automatic driving system 100 becomes not to work well, the amplitude of vibration of the lateral deviation increases, or the center of vibration of the lateral deviation is displaced laterally to the right or the left. According to one method, when magnitude of the lateral deviation is larger than a predetermined threshold, it is determined that the automatic driving system 100 is not working well.

A dot-and-dash curved line in FIG. 3 shows a signal obtained by processing a signal of the lateral deviation by a low-pass filter. This signal indicates a steady-state deviation included in the lateral deviation. A broken curved line in FIG. 3 shows a signal obtained by taking a difference between the signal of the lateral deviation and the signal of the steady-state deviation. This signal indicates a transient deviation included in the lateral deviation. There is a difference in the content that the automatic driving system is not working well between a condition where the steady-state deviation is large and a condition where the transient deviation is large. Therefore, it is preferred to change the content of the coping processing for coping with the condition where the automatic driving system is not working well. The automatic driving system 100 according to the present embodiment performs determining processing to determine whether or not magnitude of the steady-state deviation is larger than a predetermined threshold, and also performs determining processing to determine whether or not magnitude of the transient deviation is larger than a predetermined threshold. Note that, the threshold with respect to the steady-state deviation and the threshold with respect to the transient deviation may be the same value or may be different value.

The method of the determining processing is not limited to the above described method. For example, the determining processing may be performed based on a difference between a real value of a sensor to acquire information for calculating the lateral deviation and an estimated value that is estimated from the target traveling route. Also, when a delay time of recognition processing with the outside information sensor like the camera becomes large, it may be determined that the automatic driving system 100 is not working well. Furthermore, the determining processing may be performed based on a difference between a real steering angle measured by the torque sensor 14 and a target steering angle determined based on the target traveling route. In any case, any information related to trackability of the vehicle with respect to the target traveling route can be used for the determining processing.

Next, an overview of the coping processing by the automatic steering control part 26 will be described with an example where the determining processing based on the steady-state deviation and the determining processing based on the transient deviation are performed. FIG. 4 is a view describing the overview of the coping processing in the case of the example. In FIG. 4, "Large" of the steady-state deviation means that the steady-state deviation is larger than the threshold, and "Small" of the steady-state deviation means that the steady-state deviation is equal to or less than the threshold. Similarly, "Large" of the transient deviation means that the transient deviation is larger than the threshold, and "Small" of the transient deviation means that the transient deviation is equal to or less than the threshold.

When the steady-state deviation is large, the steering wheel 10 is correctively steered to one direction by the steering torque generated by the automatic steering control. When the driver intervenes in steering in the case where the automatic driving system is not working well, the driver has to steer the steering wheel 10 against the steering torque and is put a large load on. Accordingly, when the steady-state deviation is larger than the threshold, the automatic steering control part 26 increases the assisting force for assisting the driver's steering operation in comparison with the case where the automatic driving system 100 is working well. Thereby, the load on the driver is lightened and discomfort given to the driver is reduced.

When the transient deviation is large, the steering wheel 10 is correctively steered to right and left directions by the steering torque generated by the automatic steering control. When the driver intervenes in steering in the case where the automatic driving system is not working well, the driver has to keep the steering wheel 10 against the steering torque generated by the automatic steering control, and senses troublesomeness. Then, when the transient deviation is larger than the threshold, the automatic steering control part 26 decreases a control gain of the automatic steering control in comparison with the case where the automatic driving system 100 is working well. Thereby, periodic steering of the steering wheel 10 by the steering torque is suppressed and troublesomeness given to the driver is reduced.

When the steady-state deviation is large and also the transient deviation is large, the automatic steering control part 26 performs the coping processing for the case where the steady-state deviation is large while performing the coping processing for the case where the transient deviation is large. On the contrary, when the steady-state deviation is small and also the transient deviation is small, the automatic driving system 100 is normal. In this case, the coping processing is not performed, and the automatic steering control is performed as usual by the automatic steering control part 26.

3. Details of Configuration of Automatic Steering Control Part

Figure 5:
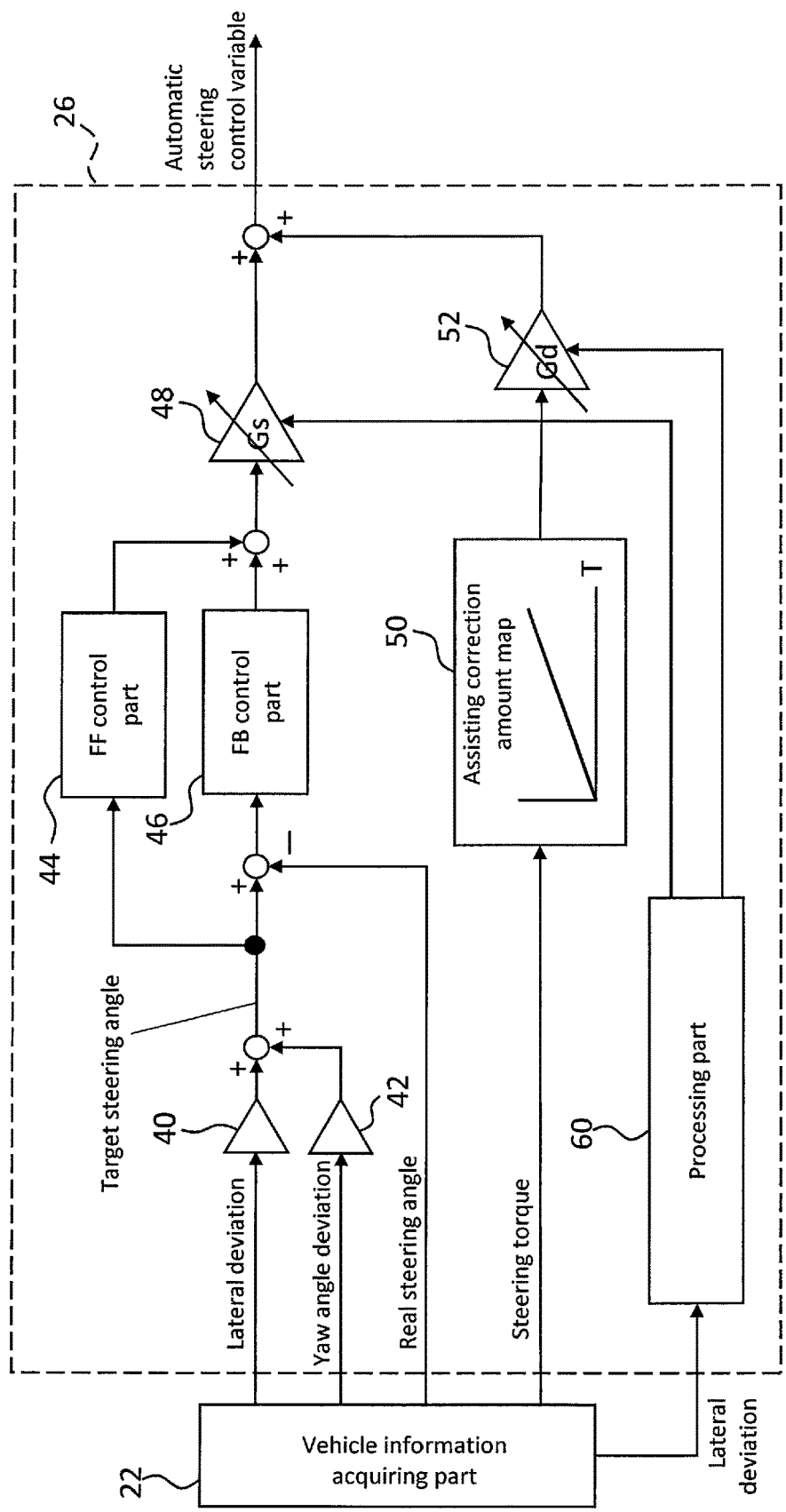
FIG. 5 is a block diagram illustrating a configuration of an automatic steering control part of the automatic driving system.

Next, a specific configuration of the automatic steering control part 26 to realize the above described functions will be described using FIG. 5. In FIG. 5, functions of the automatic steering control part 26 is illustrated with blocks. As illustrated with blocks in FIG. 5, the automatic steering control part 26 comprises a lateral deviation gain multiplication part 40, a yaw angle deviation gain multiplication part 42, a FF control part 44, a FB control part 46, a system gain multiplication part 48, an assisting correction amount calculation part 50, a driver gain multiplication part 52, and a processing part 60. These parts 40, 42, 44, 46, 48, 50, 52, 60 that the automatic steering control part 26 comprises correspond to a program or part of a program that is stored in the memory of the control apparatus 20. The functions of these parts 40, 42, 44, 46, 48, 50, 52, 60 are realized in the control apparatus 20 by the program being read from the memory and being performed with the processor. The function of each part 40, 42, 44, 46, 48, 50, 52, 60 is described sequentially as follows.

The lateral deviation gain multiplication part 40 acquires the lateral deviation of the vehicle with respect to the target traveling route from the vehicle information acquiring part 22, and multiplies it by a predetermined gain to convert it into a steering angle. The lateral deviation of the vehicle with respect to the target traveling route is, specifically, a minimum distance from the vehicle to the center line of a lane set as the target traveling route. This minimum distance is calculated using camera information, GPS location information, and so on.

The yaw angle deviation gain multiplication part 42 acquires the yaw angle deviation of the vehicle with respect to the target traveling route from the vehicle information acquiring part 22, and multiplies it by a predetermined gain to convert it into a steering angle. The yaw angle deviation of the vehicle with respect to the target traveling route is, specifically, a deviation angle between a traveling direction of the vehicle and a tangent at a point where a distance from the vehicle to the target traveling route is minimized. This deviation angle is calculated using camera information, GPS location information, a yaw rate and so on. The sum of the steering angle converted from the lateral deviation and the steering angle converted from the yaw angle deviation is set as the target steering angle.

The FF control part 44 acquires the target steering angle, and multiplies it by a predetermined gain to convert it into a control variable. The control variable output from the FF control part 44 is a feedforward term of an automatic steering control variable that is given to the motor driver 12 from the automatic steering control part 26. Hereafter, it is referred to as a FF control variable. Also, the gain used in the FF control part 44 is referred to as a FF gain.

The FB control part 46 acquires a difference between the target steering angle and the real steering angle, and performs PID control with respect to the difference to obtain a control variable. The control variable obtained by the PID control is a feedback term of the automatic steering control variable that is given to the motor driver 12 from the automatic steering control part 26. Hereafter, it is referred to as a FB control variable. Also, each gain of P term, I term, D term of the PID control is collectively referred to as a FB gain.

The FF control variable1 output from the FF control part 44 and the FB control variable output from the FB control part 46 are summed up. A control variable obtained by this summing is used as a basic automatic steering control variable. The system gain multiplication part 48 acquires the basic automatic steering control variable, and multiplies it by a system gain Gs. The system gain Gs is a variable gain of which the default value is, for example, 1. Each of the FF gain, the FB gain and the system gain Gs is collectively referred to as the control gain of the automatic steering control.

The assisting correction amount calculation part 50 calculates an assisting correction amount for making the motor 8 generate the assisting force for assisting the driver's steering operation against the automatic steering control. An assisting correction amount map of which the image is shown in the block is used for calculating the assisting correction amount. By using the assisting correction amount map, the assisting correction amount is calculated from the steering torque T input by the driver that is measured by the torque sensor 14. However, characteristics of the map exemplified in FIG. 5 are characteristics obtained when the steering wheel 10 is turned to the left. When the steering wheel 10 is turned to the right, characteristics symmetric with respect to a zero point are used.

The driver gain multiplication part 52 acquires the assisting correction amount from the assisting correction amount calculation part 50, and multiplies it by a driver gain Gd. The driver gain Gd is a variable gain of which the default value is, for example, zero. The assisting correction amount multiplied by the driver gain Gd in the driver gain multiplication part 52 is added to the basic automatic steering control variable multiplied by the system gain Gs in the system gain multiplication part 48. Thereby, the basic automatic steering control variable is corrected by the assisting correction amount, and the basic automatic steering control variable that is corrected becomes the automatic steering control variable that is finally output from the automatic steering control part 26.

The processing part 60 acquires the lateral deviation from the vehicle information acquiring part 22, and extracts the steady-state deviation and the transient deviation from the lateral deviation. Then, the processing part 60 compares the steady-state deviation and the transient deviation with the respective thresholds to determine whether the automatic driving system 100 is not working well and to determine a type that the automatic driving system 100 does not work well. The type that the automatic driving system 100 does not work well includes that the steady-state deviation is large, that the transient deviation is large, and that both of them are large as classified with a table in FIG. 4.

The processing part 60 performs the coping processing appropriate for the type that the automatic driving system 100 does not work well. When the steady-state deviation is large, increasing the driver gain Gd is performed. By increasing the driver gain Gd, the assisting correction amount added to the automatic steering control variable increases, and thereby the assisting force for assisting the driver's steering operation increases in comparison with the case where the automatic driving system 100 is working well. When the transient deviation is large, decreasing the system gain Gs is performed. By decreasing the system gain Gs, the control gain of the automatic steering control decreases, and thereby the periodic steering of the steering wheel 10 by the steering torque is suppressed. When both the steady-state deviation and the transient deviation are large, the driver gain Gd is increased and the system gain Gs is decreased. Hereunder, details of the coping processing by the processing part 60 will be described with reference to a flowchart.

4. Details of Coping Processing

Figure 6:
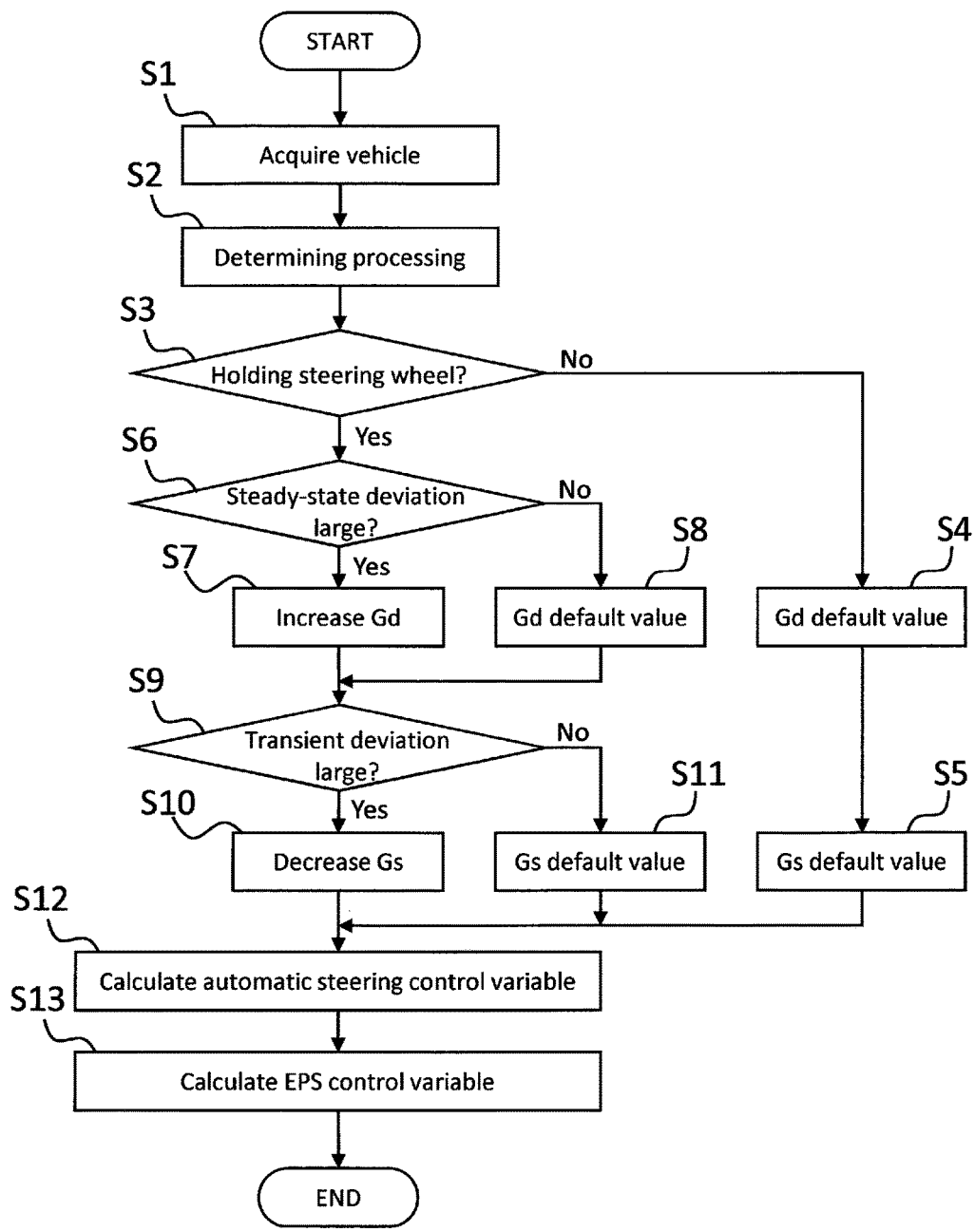
FIG. 6 is a flowchart illustrating flow of processes until the coping process is reflected to an EPS control variable.

FIG. 6 is a flowchart illustrating flow of processes until the coping process by the processing part 60 is reflected to the EPS control variable. The control apparatus 20 reads a program made based on this flowchart from the memory and executes the program at a predetermined period.

First, in step S1, the vehicle information for the determination processing is acquired. The vehicle information acquired in step S1 includes at least the lateral deviation of the vehicle with respect to the target traveling route.

In step S2, the determination processing is performed based on the vehicle information acquired in step S1. Specifically, the steady-state deviation and the transient deviation are extracted from the lateral deviation. Then, it is determined whether the steady-state deviation is larger than the threshold, and it is determined whether the transient deviation is larger than the threshold.

In step S3, it is determined whether the driver is holding the steering wheel 10. The signal of the torque sensor 14 for example is used for this determination. When the driver is holding the steering wheel 10, the steering torque input by the driver is detected from the signal of the torque sensor 14. When the determination result of step S3 is negative, that is, when the driver is not holding the steering wheel 10, the coping processing is not performed regardless of the result of the determination processing of step S2. In this case, the driver gain Gd is kept at the default value in step S4, and the system gain Gs also is kept at the default value in step S5. Stated differently, during hand-releasing drive in which the driver is not holding the steering wheel 10, the coping processing is not performed to keep the degree with which the automatic steering control is reflected to the EPS control variable. Thereby, decrease of the trackability during the hand-releasing drive can be prevented.

When the determination result of step S3 is positive, that is, when the driver is holding the steering wheel 10, it can be determined that there will be a steering intervention by the driver. In this case, the result of the determining processing of step S2 is acquired in step S6, and next processing is selected based on a comparison between the steady-state deviation and the threshold. When the steady-state deviation is larger than the threshold, the driver gain Gd is changed into a value larger than the default value in step S7. When the steady-state deviation is equal to or less than the threshold, the driver gain Gd is kept at the default value in step S8.

In step S9, the result of the determining processing of step S2 is acquired, and next processing is selected based on a comparison between the transient deviation and the threshold. When the transient deviation is larger than the threshold, the system gain Gs is changed into a value smaller than the default value in step S10. When the transient deviation is equal to or less than the threshold, the system gain Gs is kept at the default value in step S11.

When the value of the driver gain Gd and the value of the system gain Gs are determined respectively by the above described processing, processing of step S12 is performed next. In step S12, the automatic steering control variable is calculated using the driver gain Gd and the system gain Gs. When the driver gain Gd is made larger than the default value, the assisting correction amount added to the automatic steering control variable increases. When the system gain Gs is made smaller than the default value, the automatic steering control variable decreases.

In step S13, the automatic steering control variable calculated in step S12 is added to the sum of the basic assisting control variable and the damping control variable that are calculated by the EPS control part 24. Then, a control variable obtained by this addition is output as the EPS control variable.

5. Other Embodiments

The configuration of the automatic steering control part 26 shown in FIG. 5 is one example that is capable of realizing the functions required to the automatic steering control part 26. The automatic steering control part 26 may be configured as a modification shown in FIG. 7. Functions of the modification of the automatic steering control part 26 are illustrated with blocks in FIG. 7. This modification comprises a driver-gain multiplication part 70 and a driver correction gain setting part 72, in place of the assisting correction amount calculation part 50 and the driver-gain multiplication part 52 that are provided in the configuration shown in FIG. 5.

The driver-gain multiplication part 70 acquires the steering torque from the vehicle information acquiring part 22, and multiplies it by the driver gain Gd. The driver gain Gd is a variable gain of which the default value is, for example, zero.

The driver correction gain setting part 72 acquires the steering torque T that is multiplied by the driver gain Gd in the driver-gain multiplication part 70, and sets a driver correction gain based on the absolute value of the steering torque T. A driver correction gain map of which the image is shown in the block is used for setting the driver correction gain. According to the driver correction gain map, the value of the driver correction gain is kept at 1 when the absolute value of the steering torque T is equal to or less than a predetermined value, and the value of the driver correction gain is changed into a value smaller than 1 when the absolute value of the steering torque T is larger than the predetermined value.

The basic automatic steering control variable multiplied by the system gain Gs is further multiplied by the driver correction gain set in the driver correction gain setting part 72. According to this modification, the basic automatic steering control variable corrected by the driver correction gain is finally output as the automatic steering control variable from the automatic steering control part 26.

When the steady-state deviation is large, the driver gain Gd is increased by the processing part 60. By increasing the driver gain Gd, the driver correction gain becomes easy to decrease quickly when the steering torque input by the driver increases. When the driver correction gain decreases, the automatic steering control variable corrected with the driver correction gain decreases. As the result, the basic assisting control variable becomes larger than the automatic steering control variable, and thereby the assisting force for assisting the driver's steering operation increases in comparison with the case where the automatic driving system 100 is working well.

When the transient deviation is large, the system gain Gs is decreased by the processing part 60. By decreasing the system gain Gs, the control gain of the automatic steering control decreases, and thereby the periodic steering of the steering wheel 10 by the steering torque is suppressed. When both the steady-state deviation and the transient deviation are large, the driver gain Gd is increased and the system gain Gs is decreased.

Figure 7:
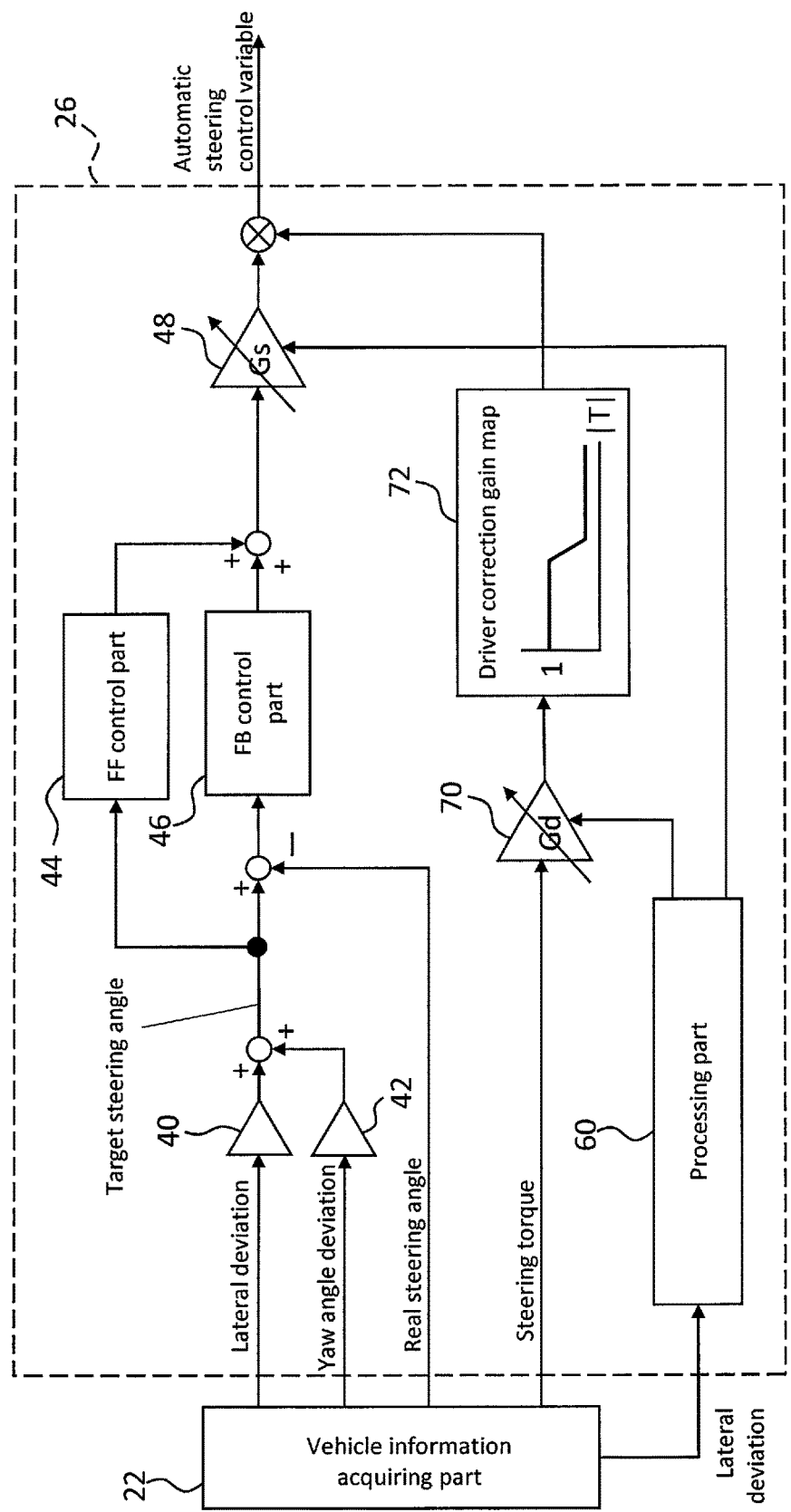
FIG. 7 is a block diagram illustrating a configuration of a modification of the automatic steering control part of the automatic driving system.

As described above, the configuration of the modification shown in FIG. 7 can obtain the same effect as the configuration shown in FIG. 5, with respect to the coping processing for coping with the condition where the automatic driving system is not working well.

In the above described embodiment and the modification thereof, each value of the FF gain and the FB gain may be decreased together with the system gain Gs or may be decreased in place of the system gain GS. By decreasing each value of the FF gain and the FB gain, the basic automatic steering control variable is decreased.

What is claimed is:

1. An automatic driving system comprising:
an electric power steering apparatus; and
a control apparatus that performs automatic steering control for controlling the electric power steering apparatus to make a vehicle travel along a target traveling route while allowing a steering intervention by a driver;
wherein the control apparatus is programmed to perform:
determining processing to determine whether the automatic driving system is working well or not working well, based on tracking condition of the target traveling route by the vehicle; and
coping processing to increase a degree with which the steering intervention by the driver is reflected to a control variable of the electric power steering apparatus when the automatic driving system is determined to be not working well.

2. The automatic driving system according to claim 1, wherein the control apparatus is programmed to perform the coping processing only when the driver is holding a steering wheel.

3. The automatic driving system according to claim 1, wherein the control apparatus is programmed to perform the determining processing based on at least one of magnitude of a lateral deviation of the vehicle with respect to the target traveling route, magnitude of a steady-state deviation extracted from the lateral deviation, and magnitude of a transient deviation extracted from the lateral deviation.

4. The automatic driving system according to claim 1, wherein the control apparatus is programmed to increase an assisting force for assisting the driver's steering operation in comparison with a case where the automatic driving system is working well, in the coping processing.

5. The automatic driving system according to claim 4, wherein the control apparatus is programmed to increase the assisting force for assisting the driver's steering operation in comparison with the case where the automatic driving system is working well, when magnitude of a steady-state deviation included in a lateral deviation of the vehicle with respect to the target traveling route is larger than a predetermined threshold.

6. The automatic driving system according to claim 1, wherein the control apparatus is programmed to decrease a control gain of the automatic steering control in comparison with a case where the automatic driving system is working well, in the coping processing.

7. The automatic driving system according to claim 6, wherein the control apparatus is programmed to decrease the control gain of the automatic steering control in comparison with the case where the automatic driving system is working well, when magnitude of a transient deviation included in a lateral deviation of the vehicle with respect to the target traveling route is larger than a predetermined threshold.

* * * * *